(12) United States Patent
Bradsher

(10) Patent No.: US 9,424,292 B2
(45) Date of Patent: *Aug. 23, 2016

(54) METHOD OF RANKING AND DISPLAYING CERTIFIED CONTENT

(71) Applicant: Michael J. Bradsher, Pike Road, AL (US)

(72) Inventor: Michael J. Bradsher, Pike Road, AL (US)

(73) Assignee: TROPHY STACK, INC., Pike Road, AL (US)

( * ) Notice: Subject to any disclaimer, the term of this patent is extended or adjusted under 35 U.S.C. 154(b) by 334 days.

This patent is subject to a terminal disclaimer.

(21) Appl. No.: 13/896,960

(22) Filed: May 17, 2013

(65) Prior Publication Data

US 2013/0325876 A1  Dec. 5, 2013

Related U.S. Application Data

(60) Provisional application No. 61/648,253, filed on May 17, 2012, provisional application No. 61/678,833, filed on Aug. 2, 2012, provisional application No. 61/692,886, filed on Aug. 24, 2012.

(51) Int. Cl.
   *G06F 7/00* (2006.01)
   *G06F 17/30* (2006.01)
   *G06Q 10/10* (2012.01)

(52) U.S. Cl.
   CPC .......... *G06F 17/30312* (2013.01); *G06Q 10/10* (2013.01)

(58) Field of Classification Search
   CPC ..... A01K 83/00; A01K 85/16; A47G 33/004; G01G 19/60
   USPC .......................................................... 707/748
   See application file for complete search history.

(56) References Cited

U.S. PATENT DOCUMENTS

| | | | |
|---|---|---|---|
| 6,222,449 B1 | 4/2001 | Twining | |
| 6,505,123 B1 | 1/2003 | Root et al. | |
| 6,587,740 B2 | 7/2003 | Byrne et al. | |
| 6,643,626 B1 * | 11/2003 | Perri de Resende ... | G06Q 20/20 705/16 |
| 6,862,834 B2 | 3/2005 | Basch | |
| 7,173,197 B1 * | 2/2007 | Kasperek ............... | A01K 97/00 177/131 |
| 7,200,488 B2 | 4/2007 | Taboada | |

(Continued)

FOREIGN PATENT DOCUMENTS

JP  2006158239 A  6/2006

OTHER PUBLICATIONS

Boone and Crockett Club, Apr. 28, 2012.*

(Continued)

*Primary Examiner* — Binh V Ho
(74) *Attorney, Agent, or Firm* — Dickinson Wright PLLC

(57) ABSTRACT

A method of displaying and ranking certified and user-generated content from an individual user against content from other users. The user is prompted to input user-generated information and various related information and at least one visual recording is received and associated to create a user single trophy entry in a remote database. The user single trophy entry is ranked relative to other trophy entries in the remote database, and is displayed with a determined rank. Overlay data may be automatically received and associated based on the user-generated information and the related information. To create certified user single trophy entries a list of certification partners may be displayed and used.

65 Claims, 8 Drawing Sheets

(56) References Cited

U.S. PATENT DOCUMENTS

| | | | |
|---|---|---|---|
| 7,650,327 B2 | 1/2010 | Remsen et al. | |
| 8,478,814 B2 | 7/2013 | Shafter | |
| 2002/0187723 A1* | 12/2002 | Abbas | A01M 31/004 446/202 |
| 2003/0036956 A1* | 2/2003 | Karas | G06Q 20/02 705/14.15 |
| 2003/0069896 A1 | 4/2003 | Byrne et al. | |
| 2004/0079019 A1* | 4/2004 | Basch | A01K 61/001 43/4.5 |
| 2004/0249860 A1 | 12/2004 | Stechschulte et al. | |
| 2005/0279007 A1* | 12/2005 | Trembone | A01K 85/01 43/17.6 |
| 2006/0002553 A1* | 1/2006 | Krien | G06T 7/602 380/245 |
| 2006/0095393 A1 | 5/2006 | Vinsant | |
| 2007/0110281 A1* | 5/2007 | Jurk | G06F 17/30244 382/110 |
| 2007/0188593 A1* | 8/2007 | Min | H04N 1/00307 348/14.01 |
| 2007/0220798 A1* | 9/2007 | Davidson | A01K 85/01 43/4 |
| 2008/0060210 A1* | 3/2008 | Trout | G01B 3/12 33/73 |
| 2008/0140234 A1 | 6/2008 | Shafter | |
| 2008/0228515 A1 | 9/2008 | Tachikawa | |
| 2009/0248524 A1* | 10/2009 | Defoy | G06F 17/30893 705/14.1 |
| 2012/0000713 A1* | 1/2012 | Taboada | G01G 19/60 177/1 |
| 2012/0182180 A1* | 7/2012 | Wolf | G01S 5/021 342/357.29 |
| 2013/0274906 A1 | 10/2013 | Shafter | |

OTHER PUBLICATIONS

Boone and Crockett Club web site available at http://www.boone-crocket.org/index.asp (last visited Aug. 28, 2013).

* cited by examiner

| TAXIDERMIST - PLEASE COMPLETE FORM | | |
|---|---|---|
| NAME OF PERSON WHO HARVESTED BUCK | | |
| JOHN DOE | | |
| E-MAIL ADDRESS | | |
| JOHN DOE@EMAIL.COM | | |
| PHONE NUMBER | | |
| 16-555-0000 | | |
| STATE DEER WAS HARVESTED | | |
| STATE | | |
| COUNTY DEER WAS HARVESTED | | |
| COUNTY | | |
| DATE HARVESTED | | |
| 1/14/2012 | | |
| TIME HARVESTED | | |
| 7:30 | | |
| RACK SIZE | | |
| POINTS | WIDTH | HEIGHT |
| 8 | 21" | 17" |
| WEAPON USED | CHECK BOX THAT APPLIES | PROPERTY QUESTIONS |
| A) BOW | X | LAND FOR SALE |
| B) GUN | | YES        NO |
| C) MUZZLE LOADER | | X |
| D) CROSS BOW | | LAND FOR LEASE |
| LOCATION KILLED | | YES        NO |
| A) GREEN FIELD | X | X |
| B) HARDWOODS | | |
| C) HAY FIELDS | | |
| D) RIDGE | | |
| E) ETC. | | |
| DEER ATTRACTANT USED | | |
| BIG RACK DEER SCENTS | | |
| REAL DEER | | |
| C'MERE DEER | X | |
| CODE BLUE | | |

FREE PREMIUM MEMBERSHIP TO:

TROPHYSTACK.COM
PLEASE ENTER ATTACHED CODE TO JOIN
AND RECEIVE INSTANT $100 REBATE FOR

"QUICK & EASY"
THEY ANSWER 7 BASIC QUESTIONS AND CHECK 5 BOXES
LESS THAN 1 MINUTE TO COMPLETE

| TROPHY STACK | | | | | | LOGIN OR REGISTER |
|---|---|---|---|---|---|---|
| PHOTO | #37 IN UNITED STATES<br>#34 IN ALABAMA<br>#11 IN BULL. COUNTY | DECEMBER 16<br>2011 01:28 PM | BULLCOCK<br>ALABAMA | 000.0 | 210.0 | 19.0 14.0 |
| PHOTO | #38 IN UNITED STATES<br>#35 IN ALABAMA<br>#12 IN JEFF. COUNTY | NOVEMBER 05<br>2011 04:17 PM | JEFFERSON<br>ALABAMA | 000.0 | 180.0 | 15.0 14.0 |
| | RANK | CAUGHT AT | LOCATION | WEIGHT | LENGTH | |
| PHOTO | #1 IN UNITED STATES<br>#1 IN ALABAMA<br>#1 IN MONT. COUNTY | MARCH 05<br>2012 11:45 PM | MONTGOMERY<br>ALABAMA | 10.7 | 20.0 | |
| PHOTO | #2 IN UNITED STATES<br>#2 IN ALABAMA<br>#2 IN MONT. COUNTY | MARCH 20<br>2012 10:45 PM | MONTGOMERY<br>ALABAMA | 10.3 | 20.0 | |
| PHOTO | #3 IN UNITED STATES<br>#3 IN ALABAMA<br>#3 IN MONT. COUNTY | MARCH 31<br>2012 10:45 PM | MONTGOMERY<br>ALABAMA | 8.0 | 20.0 | |

(ADVERTISING sidebar on left)

Fig. 9

TROPHY STACK — LOGIN OR REGISTER

JOHN DOE - TROPHY ROOM

| | RANK | HARVESTED AT | LOCATION | SCORE | WEIGHT | RAKE WIDTH | RAKE HEIGHT |
|---|---|---|---|---|---|---|---|
| PHOTO | #1 IN UNITED STATES<br>#1 IN ALABAMA<br>#1 IN MONT. COUNTY | DECEMBER 05<br>2011 07:35 PM | JEFFERSON<br>ALABAMA | 000.0 | 200.0 | 16.0 | 14.0 |
| PHOTO | #2 IN UNITED STATES<br>#2 IN ALABAMA<br>#1 IN JEFF. COUNTY | DECEMBER 05<br>2011 02:35 PM | JEFFERSON<br>ALABAMA | 000.0 | 205.0 | 20.0 | 13.0 |
| PHOTO | #3 IN UNITED STATES<br>#3 IN ALABAMA<br>#1 IN BULL. COUNTY | JANUARY 04<br>2012 10:25 PM | BULLOCK<br>ALABAMA | 128.0 | 150.0 | 15.0 | 17.0 |
| PHOTO | #4 IN UNITED STATES<br>#4 IN ALABAMA<br>#2 IN BULL. COUNTY | DECEMBER 16<br>2010 04:08 PM | BULLOCK<br>ALABAMA | 000.0 | 200.0 | 20.0 | 09.0 |
| PHOTO | #5 IN UNITED STATES<br>#1 IN KANSAS<br>#1 IN BUTLER COUNTY | DECEMBER 16<br>2011 03:05 PM | BUTLER<br>KANSAS | 000.0 | 225.0 | 21.0 | 09.0 |

(ADVERTISING sidebar on left)

METHOD OF RANKING AND DISPLAYING CERTIFIED CONTENT

CROSS REFERENCE TO RELATED APPLICATIONS

This U.S. utility patent application claims the benefit of U.S. Provisional Patent Application Ser. No. 61/648,253 filed May 17, 2012, U.S. Provisional Patent Application Ser. No. 61/678,833 filed Aug. 2, 2012, and U.S. Provisional Patent Application Ser. No. 61/692,886 filed Aug. 24, 2012. The entire disclosures of all applications being considered part of the disclosure of this application and hereby incorporated by reference.

BACKGROUND OF THE INVENTION

1. Field of the Invention

The subject invention provides a system and a method for generating a database of certified animal information, particularly trophy animals such as trophy game animals and then outputting information from the database to interested individuals, including providing a searchable database of relevant certified statistics regarding animals. Additionally, the subject invention provides a social media platform capable of allowing interested individuals to display and rank trophy animals.

2. Description of the Prior Art

Outdoor activities such as hunting and fishing account for a large sector of recreational spending around the globe. Americans spent an estimated 42 billion dollars on fishing related expenses and 22.9 billion dollars on hunting related expenses in 2011. Also in 2011, approximately 28 million Americans purchased fishing licenses and approximately 14.9 million Americans purchased hunting licenses. Every year many of these outdoor enthusiasts take to the field or water with the hope of taking a trophy game. Whether it is a 12 point white tail, a 10 pound largemouth bass, a drake canvasback duck, or any other animal, the taking of a trophy game represents a cherished highpoint for many outdoor enthusiasts and embodies their accomplishments as a hunter or fisherman. Similarly, bird watching, chasing, and sightings of rare or unique birds accounts for a significant amount of money each year.

Current bulletin boards, webpages, state record listings, and magazines fail to provide a convenient and modern way for outdoors enthusiasts to showcase and compare their trophy animal harvests, particularly with some measure of authenticity. Many trophy animal listings are unreliable and fail to provide certified or verifiable information, resulting in inconsistent and unbelievable data. Additionally, no service presently available offers a convenient process for displaying and certifying the authenticity of the trophy animal harvest over a period of time, for each individual outdoor enthusiast.

Other services, such as those offered by state game agencies, Boone and Crocket, and Buckmaster all require an extensive certification process that is burdensome for the hunter and the certifier alike. For example, in Michigan, a major deer hunting state, there are only three Buckmaster scorers. This means that a deer hunter in Michigan may have to drive long distances or many hours with their trophy game to have their trophy deer certified and placed on the Buckmaster website. Additionally, these services fail to present an easy to use user interface that allows an individual to quickly search and view the most relevant information.

Due to the current burdensome and inconvenient certification process, use of existing game animal certification services is limited, with only a small percentage of outdoorsmen providing verifiable information on trophy game harvests. These services also over-emphasize collection of physical data and fail to collect adequate information concerning the circumstances under which the trophy game was taken. In addition, few people enter each animal they kill during a season due to such burdensome requirements. The lack of outdoorsmen providing information to the services results in few entries from other outdoorsmen who may find the service to be unreliable or generally unused.

Due to the limited number of certified trophy game entries stored on such databases and inadequacies in the information collected, currently available services are not able to recognize meaningful trends in trophy game activity and movement. No service presently available to the relevant market is able to rank and output to the market trends in trophy game activity based on a variety of factors. Additionally, these services fail to present an easy to use user interface that allows an individual to quickly search and view the information that is most relevant to them.

In addition, few individuals enter each animal they harvest during a season due to such burdensome requirements and most individuals at most visit the sites only one to two times a year to view the rankings. Accordingly, the minimal traffic associated with these websites is extremely light, and is non-recurring, thereby preventing them from functioning as a viable social media platform with which fellow outdoorsmen may interact in a virtual environment.

SUMMARY OF THE INVENTION

The subject invention provides a system and a method for generating a database of certified animal information, particularly trophy animals such as trophy game animals and then outputting information from the database to interested individuals, including providing a searchable database of relevant certified statistics regarding animals. Additionally, the subject invention provides a social media platform capable of allowing interested individuals to display and rank trophy animals.

The invention provides a method for generating the ranking of information in a database, and a method for displaying and ranking content from an individual user against content from other users. The method may include the step of prompting an individual user to input user-generated information. User-generated information may include outdoorsman identity data, equipment data, and physical data. The method may also include the step of receiving related information concerning the location and time as well as a visual recording of the trophy from the individual user. The method may include the step of determining the closest certification partners from the related information and displaying the business information concerning the closest certification partners to the individual user.

The user may then take the trophy to the certification partner, who may then certify the size and quality information relating to the trophy, as well as upload a visual recording of the trophy. If the certification partner certifies the entry, it may take the form of a certified trophy game entry. Of course, the system and method may provide alternatives for certifying entries. The certified trophy game entry may be uploaded automatically and in real time to the database by the certification partner. The captured visual recording, related information, and user-generated information may then be associated in the database to create a user single trophy entry. The user single trophy entry may then be ranked against other single trophy entries in the database, and the user single trophy entry may also be displayed with the determined rank.

The method may also include offering a profit sharing incentive to the certification partners, corresponding to the number of certified trophy game entries uploaded. A higher number of certified trophy game animal entries correspond to a higher profit sharing incentive for that certification partner.

Thus, the present invention for generating a database of certified trophy game information produces several advantages. By collecting at least a portion of the input information from one of the certification partners, the method saves outdoorsmen time—only requiring them to answer a few quick questions before submitting a trophy game entry, which can be done on their behalf by the certification partner, and before or after bringing the trophy game to the certification partner. This ensures a quick and easy submission process for the outdoorsman. The method also provides incentive for certifying the trophy entry and offering profit sharing incentives for to potential certification partners including taxidermists, meat processors, marinas, and bait shops, which have existing relationships with outdoorsmen clients. No longer will an outdoorsman have to travel great distances to have a trophy game certified. These aspects, when autonomously combined with overlay data from a plurality of databases, will provide a database having greater functionality and capable of providing much more informative information beyond who has taken the biggest trophy game and achieving greater popularity than prior art databases. According to the method provided herein, the database that is generated is easy enough for outdoorsmen to use and access while thorough enough to provide large volumes of certified data useful in recognizing trends in trophy game animal activity and movement.

Additionally, the invention provides a social media platform for displaying and ranking trophy animals, birds, or new wildlife taken or spotted by a plurality of users. The social media platform includes a database containing a plurality of trophy entries uploaded by the users. Each trophy entry may include user input information and a visual recording of the trophy. The user input information may include physical data, user identity data, equipment data, time data, location data, and overlay data.

The social media platform may include a ranking module having executable instructions for ranking the trophy entries stored in the database by comparing at least a portion of the physical data of each trophy entry to generate a list of ranked trophy entries. An output module having executable instructions for outputting the trophy entries and the list of ranked trophy entries to a social media user interface may be provided.

The social media user interface may include a user page presenting the list of ranked trophy entries. The list of ranked trophy entries may display the visual recording and at least a portion of the user input information for each of the trophy entries presented on the list. The social media user interface may also include a user trophy room for each user of the social media platform. The trophy room is populated with and presents all of the trophy entries uploaded by the user over a pre-determined period of time. Each trophy entry presented in the trophy room may display the visual recording and at least a portion of the user input information associated with that trophy entry. The ranking module may also have executable instructions for ranking the trophy rooms of a plurality of users to generate a list of ranked trophy rooms. The executable instructions may rank the trophy rooms based on any number of desirable criteria such as the number of trophy entries presented in the trophy rooms, physical characteristics of specific trophy animals, geographic locations, or the number of different species of trophy animals presented in the trophy rooms.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a screenshot illustrating an exemplary electronic form used for collecting user-generated information in accordance with an aspect of the subject invention.

FIG. 8 is a screenshot illustrating an exemplary webpage for searching and accessing the database generated in accordance with an aspect of the subject invention.

FIG. 9 is a screenshot illustrating an exemplary webpage showing the certified trophy animal entries taken and uploaded by a single individual in a trophy room in accordance with an aspect of the subject invention.

DETAILED DESCRIPTION OF THE ENABLING EMBODIMENTS

Referring to the Figures, wherein like numerals indicate corresponding parts throughout the several views, a method 20 for displaying and ranking content from an individual user against content from other users is provided. Also, a method 20 as described above including additional steps for certifying trophy information, such as trophy game animal information, through a network containing a plurality of certification partners is provided. Finally, a social media platform for displaying and ranking trophies taken by a plurality of users 60 is provided.

Figure 1:
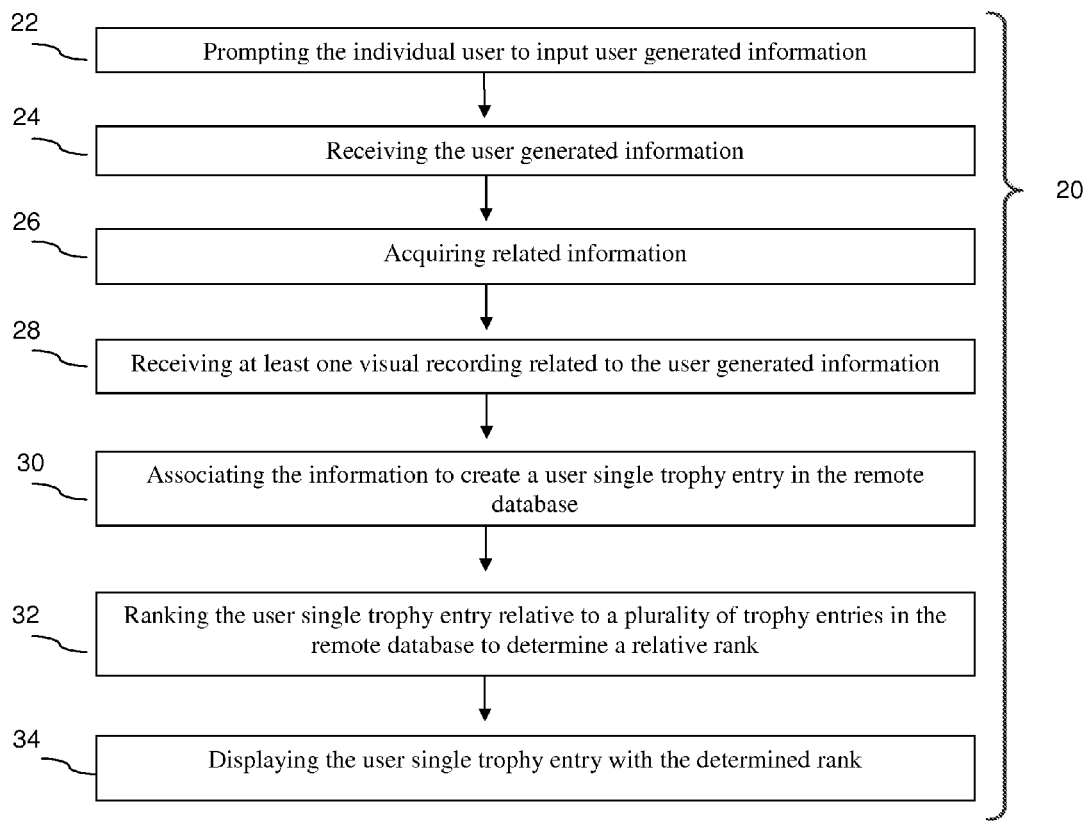
FIG. 1 is a block diagram flow chart illustrating the method for displaying and ranking content from one user against content from other users.

Referring to FIG. 1, the method 20 for displaying and ranking content from an individual user against content from other users requires a step of prompting 22 the individual user to input user-generated information. The method 20 receives 24 the user-generated information, acquires 26 related information, and receives 28 at least one visual recording related to the user-generated information. The method 20 associates 30 the user-generated information, the related information, the captured visual recording, and any other desired information and media to create a user single trophy entry in a remote database 62. The method 20 uses any received associated user-generated information, related information, and captured visual recording in a user single trophy entry and the ranks 32 the user single entry relative to a plurality of single trophy entries in the remote database based on a selected criteria to determine a relative rank. Once the user single trophy entry is ranked 32 the method 20 may display 34 the user single trophy entry with the determined rank.

Figure 2:
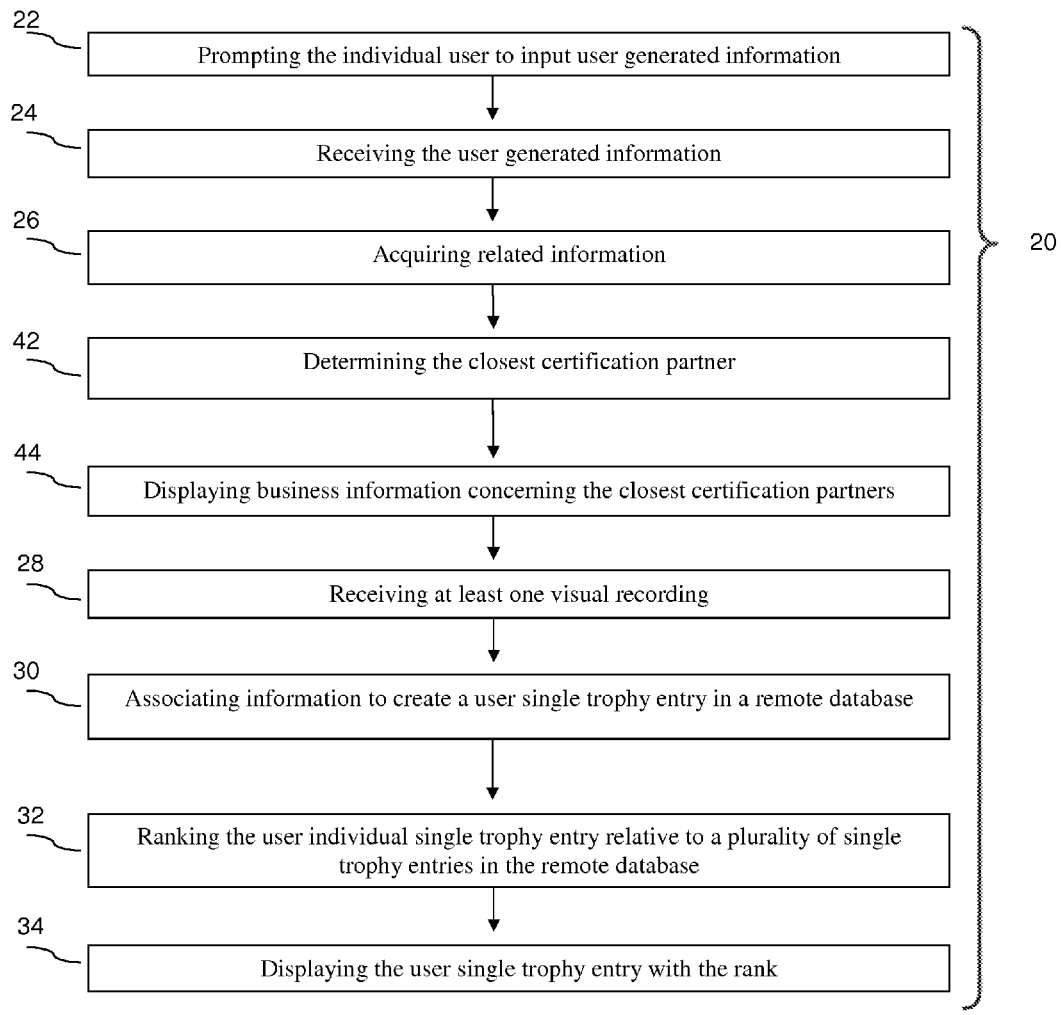
FIG. 2 is a block diagram flow chart illustrating the method of certifying trophy game information through a network containing a plurality of certification partners.

As illustrated in FIG. 2, the method 20 may perform additional steps relating to certifying the user single trophy entry. The method 20 performs the steps of prompting 22 the individual user to input user-generated information, receives 24 the user-generated information, and acquires 26 related information. The method 20 may also determine 42 the closest certification partner from the plurality of certification partners and display 44 the business information 50 concerning the closest certification partners. The method 20 will also receive 28 at least one visual recording related to the user-generated information and associate 30 the user-generated information, the related information, and the captured visual recording as, well as any other desired information, to create a user single trophy entry in a remote database. The method 20 uses the associated user-generated information, the related information, and the captured visual recording which created a user single trophy entry to rank 32 the user single entry relative to a plurality of single trophy entries in the remote database to determine a relative rank. The method 20 then displays 34 the user single trophy entry with the determined rank, and such display may be individually or with selected single trophy entries.

Figure 4:
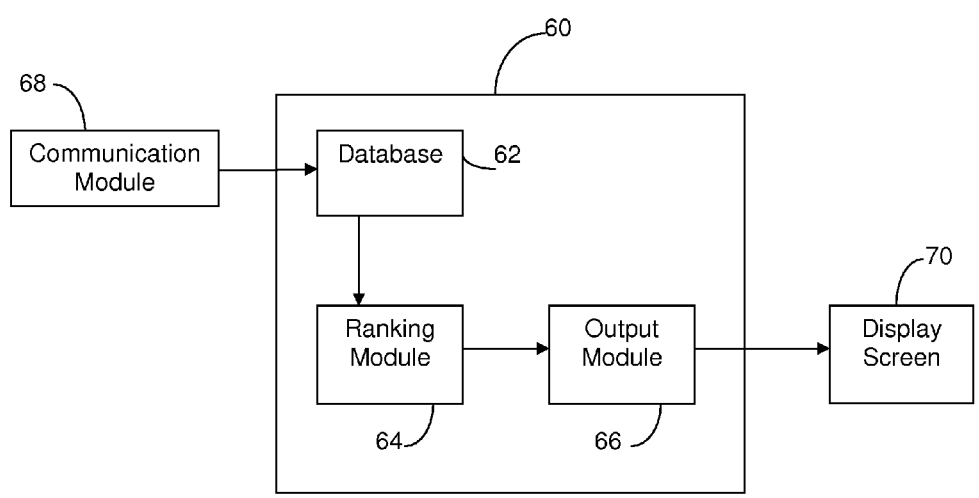
FIG. 4 is a block diagram showing the social media platform for displaying and ranking trophies taken by a plurality of users.

Referring to FIG. 4, the social media platform 60 for displaying and ranking trophies taken by a plurality of users includes a database 62 containing a plurality of trophy entries uploaded by the plurality of users. Each trophy entry is expected to include user input information and a visual recording of the trophy entry. The social media platform 60 for ranking and displaying trophies taken by a plurality of users also includes a ranking module 64 having executable instructions for ranking the plurality of trophy entries stored in a database into a list of ranked trophy entries. The list of ranked entries may be displayed by users who have not uploaded any or any relative trophy entries. Then, the social media platform 60 for ranking and displaying trophies taken by a plurality of users may include an output module 66 having executable instructions for outputting the ranked trophy entries and the list of ranked trophy entries to a social media user interface. The social media user interface 60 may include a user page 54 presenting the list of ranked trophy entries, and the list may include and identify any trophy entries uploaded by that user.

As used in this application, the term "trophy game harvest" refers to a game animal or trophy game taken by a user or by an outdoorsman. The term "outdoorsman," as it is used herein, is not meant to be gender specific and may refer to both men and women. In accordance with this method, the trophy game may be from a wide range of animal species generally targeted by outdoorsmen. It should be appreciated that the outdoorsman may be a hunter or a fisherman. The term "taken," as it is used herein, is meant to cover catching, capturing, trapping, or dispatching the trophy game. In some circumstances, capturing may be defined as capturing the animal in some tangible medium other than physically capturing the animal such as in a picture or video recording. Accordingly, the term "taken" is not limited to animals killed as taken animals, such as fish or other trapped animal. For example, for bird watchers, capturing a picture may be sufficient to qualify as taken. It additionally encompasses animals which may be kept alive and returned to the wild after photographing and recordation of the physical data. It should also be appreciated that user-generated information may also be referred to as input information or user input information. Finally, it should be appreciated that trophy game, trophy entry, and trophy game harvest can be used interchangeably.

Referring to FIG. 1, the method 20 for displaying and ranking content from an individual user against content from other users first requires the step of prompting 22 the individual user to input user-generated information. The individual user can be prompted in several ways. These include, but are not limited to, prompting through a website to enter the user-generated information via an electronic form 52 or prompting the individual user through a mobile application to enter the user-generated information. The user may be the person taking the animal or, in some instances, the user may be substituted with a certification partner as described more detail below. As such, a certification partner may receive the prompt 22 and enter the user-generated information as provided to them by a user. A screenshot illustrating an exemplary electronic form 52 used for collecting the user-generated information may be seen in FIG. 5.

As illustrated in FIG. 1, the method may receive 24 user-generated information, in accordance with the disclosed method 20 in response to the previous prompt 22. The user-generated information may broadly include outdoorsman identity data, equipment data, and physical data. The outdoorsman identity data may include a name of the outdoorsman, that is, the user, who harvested or took the trophy game, an e-mail address for the outdoorsman, a phone number for the outdoorsman, age, gender, number years engaging in the activity, such as hunting, or any other desirable information. The equipment data may include equipment used by the outdoorsman to take the trophy game and any desired information regarding that equipment. For example, equipment data may list the weapon used to take the trophy game, any bait, if used, or any attractant, including the brand of attractant. Equipment data concerning the weapon used to take the trophy game may additionally include general classifications, depending on the type of activity or sport. For example, for hunting the equipment may be broken into general classifications such as firearm, trap, crossbow, or bow. In the case of a firearm, the equipment data may more specifically list the type of firearm as well as the manufacturer, model, caliber of the weapon, type of ammunition used, and any other relevant information such as choke tubes for a shotgun. Alternatively, where the trophy game is a fish, the equipment data may include tackle, lure, type of line, line test, rod and reel information. The equipment information could also be type, make, and model of camera as well as the lens and the conditions such as shutter speed and aperture. Of course, for other activities and animals, the equipment may vary and likewise the desired input may vary for what is desired information. The equipment data may further include the name of a guide service, lodge, camp, or other facility used by the outdoorsman as well as other types of ancillary services.

The physical data collected varies depending on the species of the trophy game harvested or taken by the outdoorsman, as well as the method of taking. The physical data generally identifies the species of game animal taken and quantifies size and/or quality characteristics of the trophy game. For example, where the trophy game is a deer, the physical data may include weight and rack information. The rack information may include number of points, overall width as measured at the widest segment of the rack, and overall height as measured at the tallest segment of the rack. Where the trophy game is a fish, the physical data may include weight and overall length information. Where the trophy game is a wild turkey, the physical data may include weight, length of beard, and length of spur information. Where the trophy game is another game bird, the physical data may include weight and wingspan information. Of course, if the method of taking is photography, providing weight would not be possible, as well as other characteristics available as the result of fishing, hunting, and trapping. Therefore, it should be appreciated that the examples of physical data given above are exemplary and are not limiting. The method 20 disclosed herein may be applied to animal species other than those listed above and any other data relevant to the characteristics of that animal taken may be collected as physical data.

In the step of acquiring 26 related information, in accordance with the disclosed method 20, the related information may broadly include time data and location data, as well as other desired information. The time data includes a time at which the trophy game was taken and may specify date, hour, minute, and second information corresponding to the time the trophy game was taken.

The location data includes a location at which the trophy game was taken and may specify country and state and county information corresponding to the location where the trophy game was taken. While the method could request Global Positioning System (GPS) data and/or longitudinal and latitudinal positioning, it is expected that many hunters and anglers will not desire to provide specific locations to their secret spots. The location data may further include information concerning the property or land on which the trophy game was taken such as elevation or geological information. For example, the location data may include the topography of the area where the trophy game was taken. The topography information may include whether the area was forested, a field, a hillside, a valley, or more specifically, whether the area was green field, hardwoods, hayfield, ridge, or the like. In addition, the location data may include position data of the outdoorsman, such as if the trophy game was taken from the ground or a tree stand and the height of the tree stand. Where the trophy game is a fish, the location data may alternatively include the name of the body of water where the fish was taken such as GPS coordinates, lake name, river name, ocean name, bay name, pond name, stream name, water surface conditions at the time, estimated clarity of the water and the like. The topography information may further include elevation, proximity to water, and natural food sources. The topography information may also include, especially when the trophy game is a fish, water body characteristics such as water temperature, clarity, weed growth, bottom depth, depth of fish caught, baitfish, bottom composition, and submerged structure including points, drop-offs, tree trunks, pilings, stream beds, weeds, and the like. The location data may also include information indicating whether the land or property on which the trophy game was taken is for sale or for lease or other desirable information, including whether the land is publicly accessible.

The method 20 may further include, as illustrated in FIG. 1, the step of receiving 28 at least one visual recording related to the user-generated information. The visual recording may take the form of a photograph or a video of the trophy game. The person taking the animal, or in some circumstances, a certification partner or professional photographer, may take the visual recording. The visual recording may also be used as a measure of verification wherein the trophy game may be certified in addition or in place of the certification partners by viewing the visual recording. For example, a fish may be certified by viewing a visual recording showing the fish being weighed on a scale or measured with a ruler. The system may provide the means of taking an acceptable picture, such as an application on a mobile phone.

The method 20, as illustrated in FIG. 1, also includes the step of associating 30 the user-generated information, the related information, and the captured visual recording to create a single trophy entry in a remote database 62. The single trophy entry combines the user-generated information, the related information, and the visual recording of the trophy game in the form of data as a discrete package of information. Accordingly, each single trophy entry stored on the database forms part of the plurality of trophy entries which the next single trophy entry may be ranked against. The single trophy entry may be accessed and a display screen may be presented showing the user-generated information, the visual recording of the trophy game, and any overlay data. In this manner, the outdoorsman can access and view their own trophy game entries as well as the trophy game entries of fellow outdoorsmen, such as by animal species, year, location, and any other desirable characteristic.

With the data entered by the user, such as a certification partner or an outdoorsman, as described above, the method 20 may then rank 32 the user single trophy entry relative to a plurality of single trophy entries in the remote database 62 to determine a relative rank. Of course, as more entries are added, this rank may change. More specifically, the method 20, as illustrated in FIG. 1, may include the step of ranking the physical data of the single trophy entry against other physical data of other single trophy entries stored in the database. As a result of the comparison, the method 20 may include the step of ranking the single trophy entry relative to the other trophy entries stored in the database. Accordingly, multiple ranking schemes may be executed. For example, the method 20 disclosed may stack rank the heaviest deer of all time, comparing the weight information contained in the single trophy game entry against all trophy entries of deer stored in the database that include weight. Alternatively, the method 20 may stack rank the heaviest deer taken by customized time inputs, such as today, this week, this month, or this year, or any other given time period by comparing the weight information contained in all single trophy game entries for deer taken within the relevant time period. It should be appreciated that the method 20 may also rank the trophy game entries by any of the physical data criteria entered. The stack ranking may even limit the ranking to a specific geographic location such as by county or by equipment used or a combination of inputs. For example, the method may stack rank all trophy deer taken by bow in a particular state last year. Accordingly, every outdoorsman can have their fifteen minutes of frame and can ascertain useful information in the form of stack rankings as the method 20 accommodates narrow ranking schemes restricted by specific equipment data, location data, time data entries, and other desirable characteristics, that allow their trophy entry to be ranked highly.

The method 20 may also rank 32 other criteria to identify statistical trends. The method 20 may compare trophy game entries based on location data. For example, the method 20 may rank 32 the most productive counties or states for trophy deer hunting by comparing those producing the highest number of trophy deer entries in the past year. For instance, the method 20 may stack rank 32 the ten best counties in the United States for taking a trophy white tailed deer. As another example, the method 20 may rank 32 the most productive bodies of water for trophy bass fishing by comparing those producing the highest number of trophy bass entries in the past five years. For instance, the method 20 may stack rank 32 the best five lakes in Florida for catching trophy largemouth bass. Similarly, the method 20 may rank 32 the most productive guide services, lodges, camps, charter boats, or other facilities or services used by outdoorsmen. In this way, the method 20 disclosed provides an answer to the often asked question of "where do I stand the best chance of taking particular a trophy game?"

Additionally, the method 20 may rank for trophy rooms of a plurality of users to generate a list of ranked trophy rooms. The ranking of the trophy rooms may be based on any number of desirable criteria such as the number of trophy animal entries presented in the trophy rooms or the number of different species of trophy animals presented in the trophy rooms. Accordingly, the trophy room of a user may be ranked compared to the trophy rooms of other users based on the total number of trophy animal entries presented in the trophy room. Alternatively, the ranking may be based on the number of animal entries presented in the trophy room for a particular species of animal. For example, trophy rooms may be ranked based on the number of trophy deer entries presented. The trophy rooms may also be ranked based on the number of different species of animal accounted for by trophy entries presented in the trophy room. For example, trophy rooms may be ranked based on the number of different waterfowl species represented by the trophy entries presented in the trophy room. In this manner, a user may be recognized for the variety of trophy animals presented in their trophy room.

The method 20 may further include, as illustrated in FIG. 1, the step of displaying 34 the user single trophy entry with the determined rank. Additionally, the user single trophy entry could further be displayed against the ranks of other users' single trophy entries.

Figure 3:
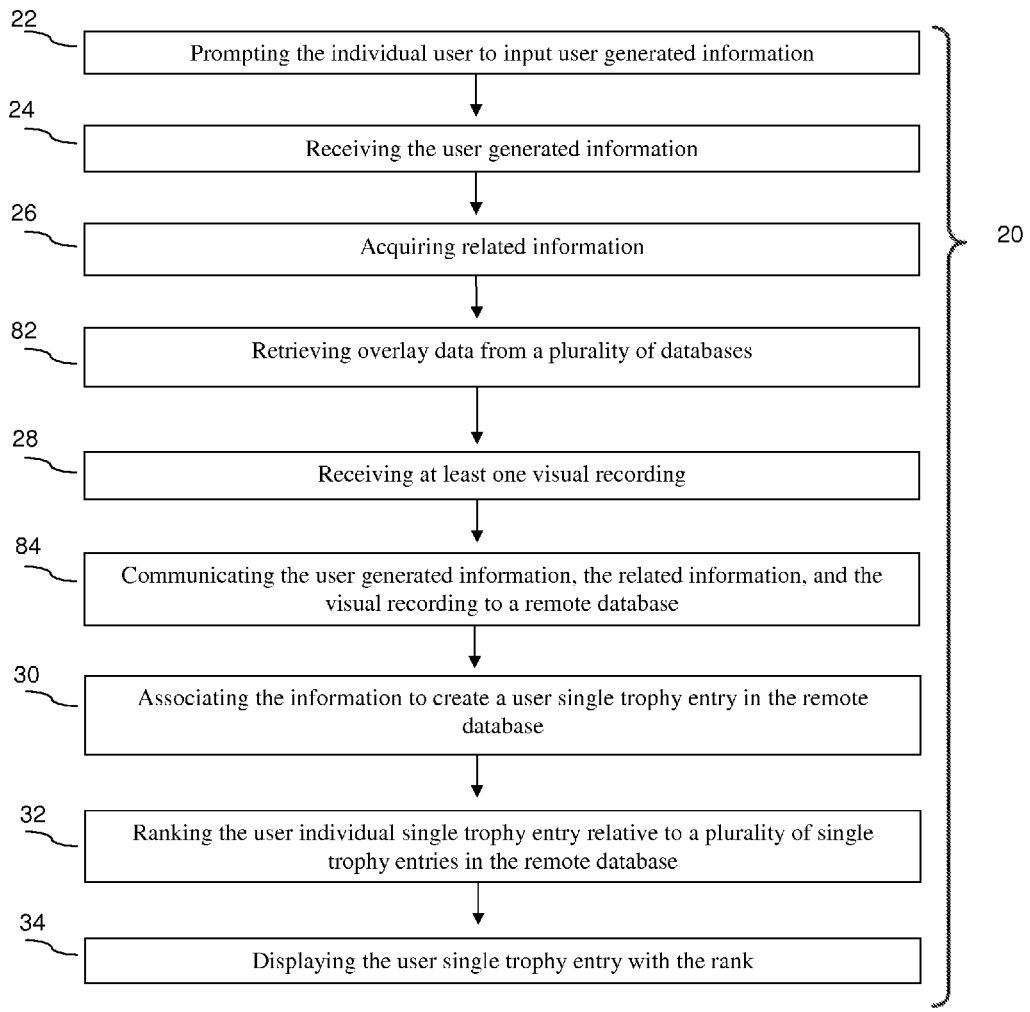
FIG. 3 is a block diagram flow chart illustrating the method of displaying and ranking content from user against content from other users including retrieving overlay data and communicating with the database.

As illustrated in FIG. 3, the method 20 may also include the step of retrieving overlay data 82 from a plurality of databases in response to collecting the time data and the location data. More specifically, the step of retrieving overlay data 82 may include retrieving a variety of environmental information based upon the provided time and location data of the trophy game harvest. For example, environmental data including weather and moon phase information may be retrieved from other databases based upon the time and location data collected. Accordingly, when the method 20 collects the time and location data of a trophy animal harvest, the overlay data such as the weather information and moon phase information corresponding to that trophy animal harvest may be automatically retrieved. The overlay data 82 may include a wide variety of other environmental information such as barometric pressure, temperature, humidity, sunrise time, sunset time, wind chill, heat index, load cover, and recent precipitation. By automatically retrieving the overlay data 82, less input information is required of the outdoorsman, by simplifying and shortening the process of data gathering and entry for the outdoorsman. Furthermore, the overlay data 82 including the environmental information has been found to be useful in determining influences on the activity level and movements of game animals. The present invention uses the overlay data to determine, a more complete picture of statistical trends in game animal activity level and movements and as such can predict the best times in geographic areas to hunt.

As illustrated in FIG. 3, the method 20 may also include the step of communicating 84 the user-generated information, the related information, and the captured visual recording to a database having a plurality of single trophy entries. The communication of the user-generated information, the related information, and the captured visual recording may take the form of a discrete package of information.

FIG. 2 is representative of a method further including steps for certifying trophy animal information through a network containing a plurality of certification partners 20. This method follows the initial steps laid out in the method of displaying and ranking content from an individual user against content from other users 20. Initially, the method 20 described herein comprises many of the steps disclosed in detail above, such as prompting 22 the individual user to input user-generated information, receiving 24 the user-generated information, and acquiring 26 related information. Additionally, the method 20, determines 42 the closest certification partners or partner from a plurality of certification partners in the remote database. The closest certification partners are determined based on user-generated information, and more particularly, from the location data entered by the individual user. The remote database 62 determines 42 the closest certification partners or partner based on business information 50 stored in the remote database 62 for the plurality of certification partners. The business information 50 includes contact information for the plurality of certification partners and services provided by the plurality of certification partners if applicable. Contact information includes, but is not limited to, street address, city, state, and zip code information, phone number, email address, or a web address. Services provided may include, but is not limited to, the type of business the plurality of certification partners are engaged in. By way of example, this could include taxidermy services, meat processing services, hunting guide services, marinas, bait shops, or boat charter services. The system may limit visible certification partners, such as a marina would not show up as a certification partner for hunting even it was the closest.

As illustrated in FIG. 2, the method 20 may display 44 the business information concerning the closest certification partners. This may be seen in FIG. 6, which depicts a screenshot illustrating an exemplary webpage 54 showing business information 50 concerning a certification partner in accordance with an aspect of the subject method 20. Any or all of the information related to the location and/or services offered by the certification partners or partner may be displayed 44 in this manner. It, of course, may be desirable to display to the user multiple certification partners.

As illustrated in FIG. 2, the method 20 may include the step of receiving 28 at least one visual recording related to the user-generated information which may occur before or after displaying 44 the business information 50 of the closest certified trophy partners. Once the visual recording is obtained 28, the method 20 may take the associated user-generated information, the related information, and the captured visual recording all of which form a user single trophy entry and the ranks 32 the user single entry relative to a plurality of single trophy entries in the remote database 62 to determine a relative rank 32. The method 20 may display 34 the user single trophy entry with the determined rank, individually or against other trophy entries, as discussed above in greater detail.

As discussed above and as illustrated above, method 20 may include the step of collecting and receiving the user-generated information and the visual recording of the trophy game. These steps may be performed by one of the certification partners, the outdoorsman, or each may perform parts of the steps that when complete allow the single trophy entry to be considered a certified single trophy entry. The certification partner may inspect and measure the trophy game and may provide some or all of the physical data. The method 20 may proceed with the step of uploading the certified trophy entry automatically and in some instances, in real time to the database in response to collecting and receiving the user-generated from one of the certification partners. All or part of the user-generated information and the visual recording included in the certified trophy entry may be supplied by the certification partner. Accordingly, the process is simple and easy for the outdoorsman wherein the outdoorsman is required to provide only small portion of the input information. For example, the outdoorsman may provide only location and type of animal or activity wherein the method and system then display closest certification partners and upon arriving at the certification partner, all of the user information may be provided.

Figure 7:
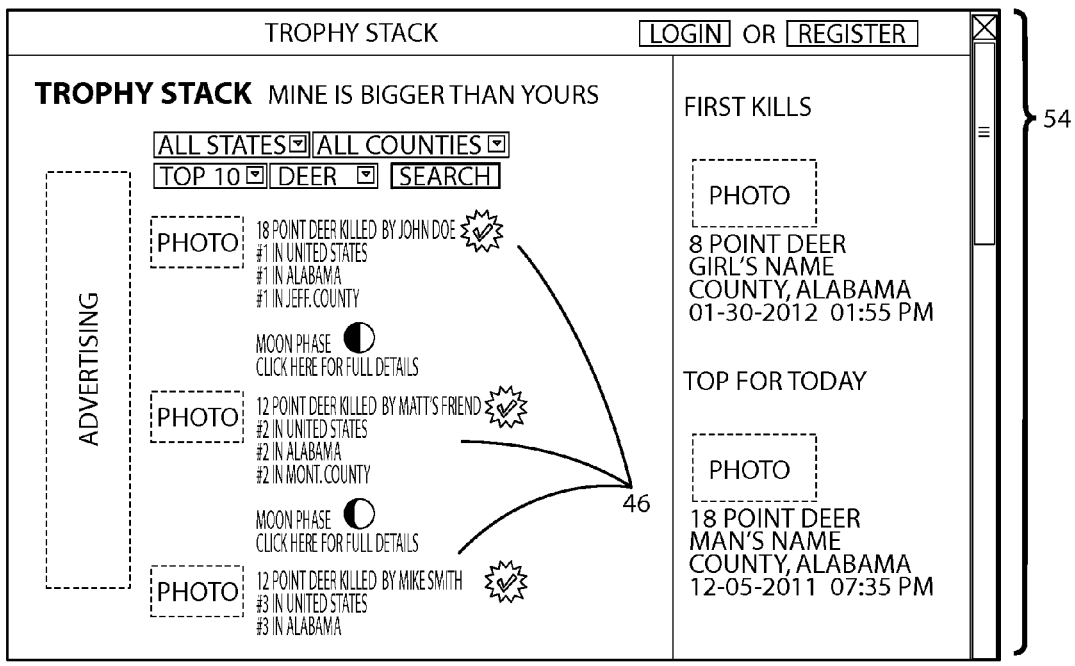
FIG. 7 is a screenshot illustrating an exemplary webpage for searching and accessing the database generated in accordance with an aspect of the subject invention.

All or a portion of this electronic form 52 may be completed by the certification partner. In response to uploading the electronic form 52, the certified trophy entry is stored on the database. The database may be accessed on a webpage 54 where interested individuals can search for and view the certified trophy entries. FIGS. 7 and 8 are screenshots showing exemplary webpages 54 illustrating a plurality of certified trophy entries 46 ranked in accordance with the method 20 presented above.

Figure 6:
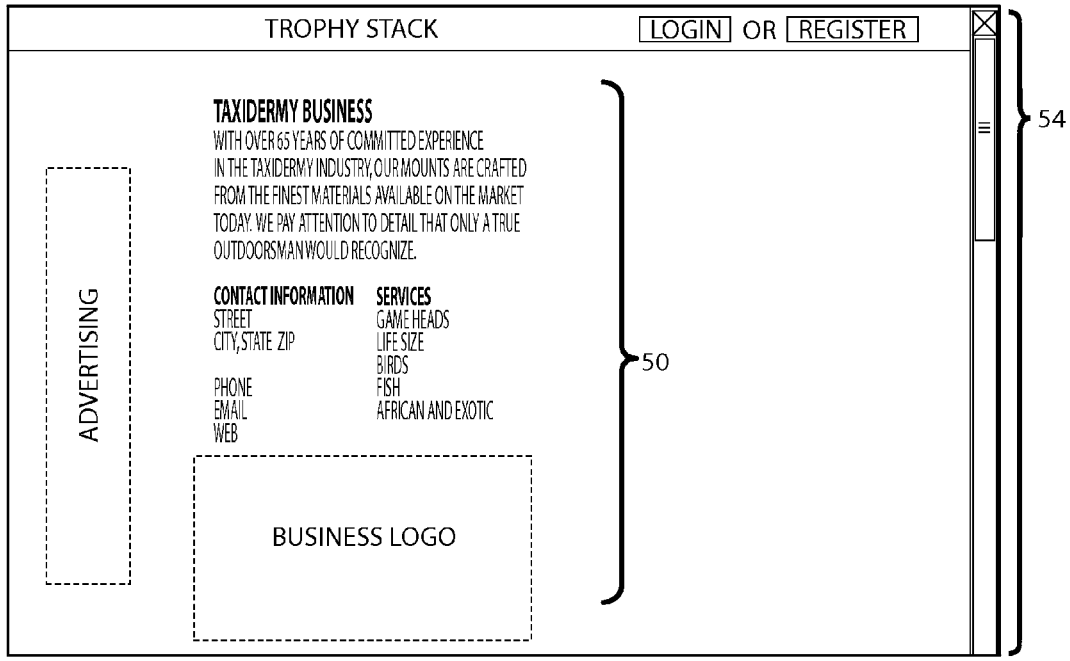
FIG. 6 is a screenshot illustrating an exemplary webpage showing information concerning a certification partner in accordance with an aspect of the subject invention.
Figure 10:
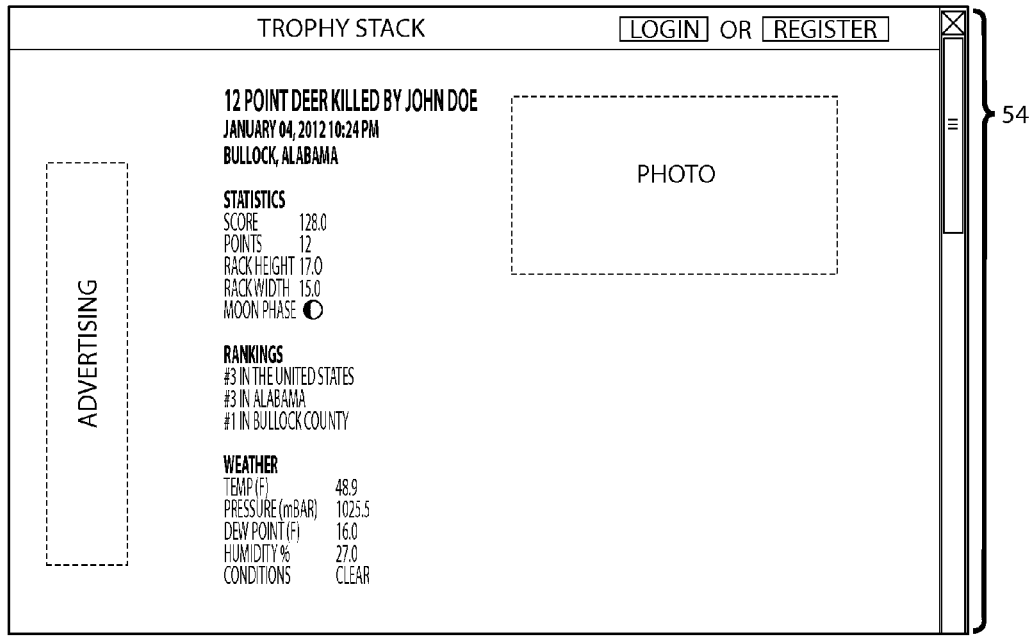
FIG. 10 is a screenshot illustrating an exemplary webpage showing a single certified trophy animal entry uploaded to the database in accordance with an aspect of the subject invention.
Figure 11:
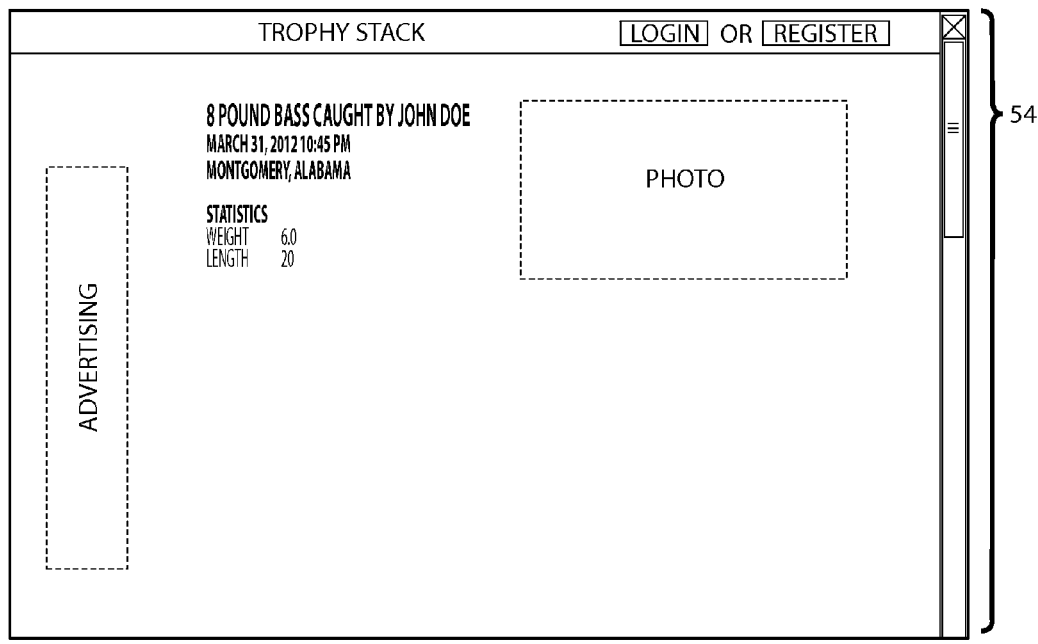
FIG. 11 is a screenshot illustrating an exemplary webpage showing a single certified trophy animal entry uploaded to the database in accordance with an aspect of the subject invention.

The webpage 54 may further include a trophy room showcasing the trophy game entries uploaded by a single individual. Accordingly, this trophy room may include trophy game entries from a plurality of years, locations, and game animal species. FIG. 9 is a screenshot illustrating an exemplary webpage 54 showing the certified trophy entries taken and uploaded by a single individual in a trophy room 48. FIGS. 10 and 11 are screenshots illustrating exemplary webpages 54 showing a single certified trophy entry uploaded to the database in accordance with the method 20 disclosed above. The webpage 54 may include all or a portion of the user-generated information, overlay data, and the visual recording associated with the single certified trophy entry. Referring to FIG. 6, and as discussed above, the webpage 54 may further include business information 50 concerning each of the certification partners in the network.

When an outdoorsman makes a trophy game harvest, the outdoorsman can take the trophy animal to one of the certification partners to be certified and uploaded to the database or identified as a certified trophy game entry. Accordingly, the network of certification partners will provide points of contact through which the outdoorsman may access and upload certified game animal entries to the database.

Active participation by the network certification partners is highly desirable as the involvement of the certification partners helps generate a database of verified information rather than one full of sensational claims. To ensure participation of the certification partners, the method 20 may further include the step of offering a profit sharing incentive to the plurality of certification partners. The profit sharing incentive may correspond to a predetermined number of certified trophy entries uploaded by each of the certification partners.

According to the incentive structure of the disclosed method 20, a higher number of certified trophy entries correspond to a higher profit sharing incentive for that certification partner. For example, the following profit sharing incentive structure may be used to encourage participation. The annual profits generated from the database may include a percentage set aside to be disbursed to the network of certification partners. This percentage may equal any percentage or amount of the annual profits generated from the database to be split between the network of certification partners. All profits disbursed to individual certification partners may be based on a profit per partner figure equaling the percentage or amount set aside for profit sharing divided by the total number of certification partners. The percentage or portion of the profits per partner disbursed to a particular certification partner may be based upon the number of certified trophy entries uploaded by that certification partner during a fixed time period. Additionally, there may be a minimum upload requirement wherein a certification partner will not be eligible to participate in profit sharing without exceeding this threshold number of certified trophy entries. The minimum upload requirement may also vary depending on the species of game animal certified and uploaded to the database.

By way of example, the profit sharing incentive may operate according to the following methodology. Where a certification partner uploads less than seventy-five certified trophy entries annually, that certification partner may be excluded from participating in profit sharing. Where a certification partner uploads seventy five to one hundred and ninety-nine certified trophy entries annually, that certification partner will be entitled to sixty percent of the profits per partner figure that year. Where a certification partner uploads two hundred to two hundred and ninety-nine certified animal entries annually, that certification partner will be entitled to seventy percent of the profits per partner figure that year. Where a certification partner uploads three hundred to three hundred and ninety-nine certified trophy entries annually, that certification partner will be entitled to eighty percent of the profits per partner figure that year. Where a certification partner uploads four hundred to four hundred and ninety-nine certified trophy entries annually, that certification partner will be entitled to ninety percent of the profits per partner figure that year. Finally, where a certification partner uploads five hundred or more certified trophy entries annually, that certification partner will be entitled to one hundred percent of the profits per partner figure that year. Accordingly, a certification partner receives a larger percentage of the profits per partner figure when that certification partner uploads a greater number of certified trophy entries in the given year. It should be appreciated that the numbers set forth in this paragraph are only presented as an example to further explain the details and structure of the profit sharing incentive. It should also be appreciated that beyond profit sharing, there is an incentive to attract customers and be displayed in the database.

FIG. 4 is representative of a social media platform 60 for displaying and ranking trophies taken by a plurality of users. Referring to FIG. 4, the social media platform 60 may include a database 62 containing a plurality of trophy entries uploaded by the plurality of users, each including user input information and a visual recording of the trophy entry. This includes collecting user input information concerning a trophy harvest. The user input information collected in accordance with the disclosed social media platform 60 may broadly include user identity data, equipment data, physical data, time data, and location data. This may further include receiving a visual recording of the trophy animal. User input information as well as the visual recording may be collected through a communication module 68 in communication with the database 62. The communication module 68 may connect with the database 62 to transmit information through an internet connection, a mobile application, or any other known form of electronic communication.

The visual recording may take the form of a photograph or a video of the trophy. The visual recording may also be used as a measure of verification wherein the trophy may be certified by viewing the visual recording. This may also include retrieving overlay data from a plurality of databases in response to collecting the time data and the location data. More specifically, retrieving overlay data includes retrieving a variety of environmental information based upon the time data and the location data of the trophy harvest. For example, environmental data including weather and moon phase information can be retrieved from other databases based upon the time and location data collected in accordance with the method disclosed. Accordingly, when the method collects the time and location data of a trophy animal harvest, the weather and moon phase information corresponding to that trophy harvest is automatically retrieved.

Referring to FIG. 4, the social media platform 60 may also include a ranking module 64 having executable instructions for ranking the plurality of trophy entries stored in the database 62 into a list of ranked trophy entries. The ranking module 64 operates by comparing at least a portion of the physical data of each trophy entry. Accordingly, the ranking module 64 may generate a list of ranked trophy entries. The list of ranked trophy entries may generally be arranged such that the most physically impressive and/or desirable trophy entry appears in a first position. For birds, they may be ranked by rarest to see, such as overall rarest, rarest in the geographical area and the like. The trophy entry occupying the first position may be followed by a plurality of sequential positions descending in impressiveness or desirability. Relative impressiveness or desirability and thus, how the trophy animals are ranked, is based upon the quantitative values of the physical data and in some instances location data. To rank the trophy entries and generate the list of ranked trophy entries, the ranking module 64 may perform the executable instructions.

The executable instructions of the ranking module 64 may include several features. For example, the ranking module 64 may compare the physical data of the single trophy entry to other physical data of other trophy entries stored in the database 62. As a result of the comparison, the ranking module 64 may rank the single trophy entry relative to the other trophy entries stored in the database 62. Multiple ranking schemes may be executed. For example, the ranking module 64 may stack rank the heaviest deer of all time by comparing the weight information contained in the single trophy entries for deer stored in the database 62. Alternatively, the ranking module 64 may stack rank the heaviest deer taken today, this week, this month, or this year by comparing the weight information contained in all the trophy entries for deer taken within the relevant time period. It should be appreciated that the ranking module 64 can rank the trophy entries by any of the physical data criteria entered. The stack ranking can be more specific by limiting the ranking to a specific geographic location such as by county or by equipment used. For example, the ranking module 64 may stack rank all trophy deer taken by bow last year. Accordingly, every user can have their fifteen minutes of frame and can ascertain useful information in the form of stack rankings as the ranking module 64 can execute narrow ranking schemes restricted by specific equipment data, location data, time data entries, and other desirable characteristics.

The ranking module 64 may also rank other criteria to identify different statistical trends. The executable instructions of the ranking module 64 may compare trophy entries based on location data. For example, the ranking module 64 may rank the most productive counties or states for trophy deer hunting by comparing those producing the highest number of trophy deer entries in the past year. For instance, the ranking module 64 may stack rank the best ten counties in the United States for taking a trophy white-tailed deer. As another example, the ranking module 64 may rank the most productive bodies of water for trophy bass fishing by comparing those producing the highest number of trophy bass entries in the past five years. For instance, the ranking module 64 may stack rank the best five lakes in Florida for catching trophy largemouth bass. Similarly, the ranking module 64 may rank the most productive guide services, lodges, camps, or other facilities used by users of the social media platform 60. In this way, the social media platform 60 disclosed provides an answer to the often asked question of "where do I stand the best chance of taking particular a trophy animal?"

The ranking module 64 of the social media platform 60 may also have executable instructions for ranking the trophy rooms of a plurality of users in addition to a single trophy entry, to generate a list of ranked trophy rooms. The executable instructions may rank the trophy rooms based on any number of desirable criteria such as the number of trophy animal entries presented in the trophy rooms or the number of different species of trophy animals presented in the trophy rooms. Accordingly, the trophy room of a user may be ranked compared to the trophy rooms of other users based on the total number of trophy animal entries presented in the trophy room. Alternatively, the ranking may be based on the number of animal entries presented in the trophy room for a particular species of animal. For example, trophy rooms may be ranked based on the number of trophy deer entries presented. The trophy rooms may also be ranked based on the number of different species of animal accounted for by trophy entries presented in the trophy room. For example, trophy rooms may be ranked based on the number of different waterfowl species represented by the trophy entries presented in the trophy room. In this manner, a user may be recognized for the variety of trophy animals presented in their trophy room, not just the individual trophy.

The social media platform 60 may also include an output module 66 having executable instructions for outputting the ranked trophy entries and the list of ranked trophy entries to a social media user interface wherein the social media user interface includes a user page presenting the list of ranked trophy entries. The social media user interface provides a software interface allowing users to access and search the database 62 as well as upload trophy entries to the database 62. It should be appreciated that by accessing the database 62, the user can view the trophy entries uploaded to the database 62 by either the user or the other users. The trophies, as well as any or all of the user input information, may be viewable on a display screen 70 in communication with the output module 66. It should also be appreciated that when a user uploads the trophy entry to the database 62 the trophy entry is permanently saved on the database 62 and that all or a portion of the trophy entry may become accessible to the other users.

The executable instructions of the output module 66 may include a variety of steps for establishing communication between the database 62 and the user device. Communication between the database 62 and the user device may take a wide variety of forms and may utilize a wide variety technologies and physical infrastructure. For example, the executable instructions of the output module 66 may establish wired or wireless communication between the database 62 and the user device via the internet. In the case of a mobile user device, wireless communication may be established via a wireless network such as WIFI or by a wide area service network such as WAN, 3G, or 4G wireless data services. In addition to establishing communication between the database 62 and the user device, the executable instructions of the output module 66 may include a variety of steps including outputting information, sending requests for information, and sending various operational commands between the database 62 and the user device to operate the social media platform 60.

The social media user interface and user page may take a variety of forms including but not limited to a webpage or a software application or a mobile application. Users can run the webpage or software application or mobile application on a variety of user devices such as but not limited to personal computers, laptops, pocket organizer devices, e-reader devices, cell phone devices, smart phone devices, and tablet devices. These devices generally may have a display screen 70 for displaying graphics and input means for entering information and selecting the graphics displayed on the display screen 70.

The user page may present the list of ranked trophy entries. The list of ranked trophy entries may display the visual recording and at least a portion of the user input information for each of the trophy entries presented in the list. The user page may also display multiple lists of ranked trophy entries ranked according to different ranking schemes. For example, the user page may display lists of ranked trophy entries for the top five deer taken in Alabama over the last ten days and the top twenty largemouth bass taken in the United States over the last five years. The lists of ranked trophy entries presented on the user page may also refresh in accordance with predetermined time intervals wherein different lists of ranked trophy entries are sequentially displayed on the user page. The user page may also display news flashes which may include outdoors related articles or single trophy entries. For example, the news flashes may show single trophy entries selected as first kills, first catches, or top for today. First kills and first catches new flashes may correspond to those trophy entries representing the user's first taking of a trophy animal of any species or of a trophy animal of a specific species. Top for today news flashes may correspond to the highest ranked trophy entry for a given species uploaded to the database 62 within the past twenty four hour time period. These news flashes and lists of ranked trophy entries may be refreshed in predetermined time intervals and may be continuously updated to provide accurate rankings and information in real time.

The user page may also include a search feature allowing users to enter a search query. The search query may be for a particular user or for a particular list of ranked trophy entries. Accordingly, the user can search for the trophy entries upload by a particular user or may define specific data that the ranking module 64 will use to produce a particular list of ranked trophy entries. The user page may additionally include ad banners, navigational tools, and links presented as selectable graphics allowing users to navigate to various other pages of the social media platform 60.

The social media user interface may further include a user trophy room for each discrete user of the social media platform 60. The user trophy room may be populated with and presents all of the trophy animal entries uploaded by the discrete user over a pre-determined period of time. For example, the user trophy room for user John Doe may include all trophy animal entries ever uploaded by user John Doe or those uploaded by John Doe during the past ten years. It should be appreciated that the trophy animal entries presented in the user trophy room may include trophy animals from a wide variety of species. The user trophy room may additionally include a plurality of trophy walls.

Each trophy wall may include a portion of the trophy entries uploaded by the user selected based upon certain criteria. For example, the user trophy room may include a trophy wall for all trophy entries uploaded by the user in a given time period such as in a given year. Alternatively, the user trophy room may include a trophy wall for all trophy entries uploaded by the user for a certain species or category of animal. For example, John Doe may have a trophy wall for all fish species and another trophy wall for all mammal species. John Doe may have a trophy wall for all trout and another trophy wall for all deer and another trophy wall for birds. Alternatively, John Doe may have a trophy wall for all trophy entries uploaded in 2012 and another for those uploaded in 2011 and so forth. It should be appreciated that the criteria for selecting the trophy entries for the trophy walls may be automatically provided by the social media platform 60 as default settings or may be customized by the user. Also, it should be appreciated that more than four trophy walls can be presented in the user trophy room.

Each of the trophy entries presented in the trophy room may display the visual recording of the trophy animal and at least a portion of the input information associated with that trophy entry. By selecting a particular animal entry, additional information may be displayed. For example, more of the user input information may be presented as well as the overlay data associated with the trophy entry in response to selection of the particular game entry. The user trophy room may further include a comment section where other users can provide written comments.

It should be appreciated that the user trophy room and the trophy walls are virtual elements of the social media user interface and are not meant to necessarily correspond with any structure or limitations commonly associated with the rooms and walls of a physical building. Also, the user trophy room and the trophy walls may be accessed by users in a variety of ways. A user may access the user trophy room of a particular user by entering a search query for the particular user using the search feature of the user home page. Alternatively, a user may access the user trophy room of a particular user by selecting a link to the user trophy page presented in the lists of ranked trophy animal entries or single trophy game entries. Accordingly, users can browse the trophy rooms of other users through use of the social media platform 60.

The social media platform 60 may additionally include a memory module. The memory module may store a variety of information including user preference information. The user preference information may include data concerning the user's use of the social media platform 60 including a viewing history of information accessed by the user and a search history of the search queries entered by the user. Accordingly, the social media platform 60 may tailor the lists of trophy entries and other information presented on the user page based upon the user identity data and the user preference information. For example, where a user lives in Texas and has entered search queries for largemouth bass taken in Texas and Louisiana in the past month, the user page for that user may include lists of the top ten largemouth bass taken in Texas and in Louisiana in the past month. In this way, the social media platform 60 tailors the user page to fit the interests of each user.

It should be appreciated that the social media platform 60 caters not only to hunters and fisherman but also to bird watchers and naturalists. The trophy entries need not correspond to animals killed or caught but could also include animals sighted or photographed. In accordance with the social media platform 60 presented above, these animal sightings can be recorded as animal entries in the database 62. Input information can be entered and overlay data can be retrieved. Accordingly, the social media interface functions in much the same way. Trophy rooms can be created showcasing the animals sighted by each user. The ranking module 64 can then rank the trophy rooms to generate a list of ranked trophy rooms. The trophy rooms may be ranked based on any number of desirable criteria such as the number of animal entries presented in the trophy rooms or the number of different species of animals presented in the trophy rooms. For example, the trophy rooms of bird watchers may be ranked based on the number of different bird species represented by the animal entries presented in the trophy rooms. Accordingly, a bird watcher may be recognized for their achievement of uploading a diverse number of bird species sightings to the database 62 as animal entries.

An animal sighting mobile application is also included within the social media platform 60. The animal sighting mobile application is configured to run on the mobile device of the user and enables the user to upload animal sightings to the database 62. Accordingly, this animal sighting mobile application can be used in conjunction with the social media platform 60 described above or by itself as a standalone application. Regardless, the animal sighting mobile application may provide useful information for identifying trends in animal numbers and animal activity levels. When used in conjunction with the social media platform 60, the animal sighting mobile application may also provide users with the opportunity to share the animals they have seen while spending time outdoors and not just those animals that they have taken.

The animal sighting mobile application may include a graphical user interface (GUI). The GUI may present a species entry feature for receiving an animal species of the animals sighted by the user. For example, the species entry feature may take the form of a drop down menu or a tumbler listing a plurality of animal species from which the user may select the species of the animal sighted. Alternatively, the species entry feature may take the form of a text box that the user can type in to enter the name of the species of the animal sighted. The GUI may also present an animal number feature for receiving a number of animals sighted by the user. Again, the animal number feature may take the form of a drop down menu or a tumbler listing a plurality of numbers from which the user may select the number of animals sighted. Alternatively, the species entry feature may take the form of a text box that the user can type in to enter the number of animals sighted. It should be appreciated that the animal number feature and the species entry feature are associated with each other such that the number of animals entered corresponds to those animals sighted of the species selected by the user. The GUI may also present a counter displaying the total number animals cited by the user for each species of animal entered using the species entry feature.

The GUI may additionally present a picture icon for taking a picture of the animals sighted by the user. To achieve this end, the animal sighting application may include a picture module having executable instructions. The executable instructions may include a series of commands or steps for capturing a visual recording using the mobile device. The executable instructions may be initiated on the mobile device by the picture module in response to selection of the picture icon by the user. It should also be appreciated that the visual recording may take the form of a photograph or a video of the animal or animals sighted by the user.

The animal sighting application may include an overlay data module. The overlay data module may have executable instructions for retrieving time data and location data from the mobile device. The overlay data module may initiate the executable instructions on the mobile device in response to receipt of the animal species and the number of animals sighted by the user. The animal sighting mobile application may also include a memory storage unit for storing animal sighting information including the visual recording, the overlay data, the animal species, and the number of animals sighted by the user.

The animal sighting application may also include a communication module. The communication module may have executable instructions for establishing a connection between the mobile device and the database 62. It should be appreciated that the connection between the mobile device and the database 62 may a wired or a wireless connection. In response to establishing the connection, the communication module may upload the animal sighting information to the database 62. The animal sighting information can then be utilized by the social media platform 60 in accordance with the method previously described. Accordingly, the animal sighting information can be treated in the same manner as the information contained in the trophy animal entries described above. As a result, the animal sighting mobile application can provide valuable information concerning animal numbers and animal behavior or activity level. Using the animal sighting information stored on the database 62, users may be able to identify the geographic locations where animal numbers are highest during a particular time of year. Users may also be able to identify a number of other trends such as how weather and time of day affects animal activity and movement. Above all else, the animal sighting mobile application will increase the amount of useful information stored on the database 62 and will give users something to do while sitting in the blind, tree-stand, or boat on days when the action is less than spectacular.

Obviously, many modifications and variations of the present invention are possible in light of the above teachings and may be practiced otherwise than as specifically described while within the scope of the appended claims. Although the steps of the method set forth herein are presented in a particular order, many variations in the order of the steps are possible. Accordingly, the present invention is not limited to the particular order of the method steps presented herein.

What is claimed is:

1. A method of displaying and ranking content from an individual user against content from other users comprising:
   prompting the individual user to input at least one of a size or quality measurement for an animal, wherein the individual user is a person harvesting a game animal;
   receiving the at least one of the size or quality measurement for an animal;
   acquiring at least one of a time data and a location data;
   receiving at least one visual recording from at least one of the individual user or a certified partner related to the at least one of the size or quality measurement for an animal;
   associating the at least one of the size or quality measurement for an animal, at least one of a time data or a location data, and the captured visual recording to create a user single trophy entry in a remote database;
   ranking the user single trophy entry relative to a plurality of single trophy entries in the remote database to determine the individual user's relative rank; and
   displaying the user single trophy entry with the determined rank.

2. The method of claim 1 wherein the ranking of the plurality of single trophy entries and the user single trophy entry is by at least one of the size or the quality information.

3. The method of claim 1 wherein the ranking of the user single trophy entry is relative to the plurality of single trophy entries stored on the remote database.

4. The method of claim 1 wherein each user single trophy entry is displayed with the determined rank.

5. The method of claim 1 further including a mobile application for uploading content to a database, and wherein the mobile application includes at least one of a picture module or a graphical user interface.

6. The method of claim 5 wherein the at least one of a picture module or a graphical user interface is the picture module and wherein the picture module assists in capturing the visual recording.

7. The method of claim 5 wherein the at least one of a picture module or a graphical user interface is the graphical user interface and wherein the graphical user interface assists in categorizing the content.

8. The method of claim 1 further including a network containing a plurality of certification partners, and wherein the method further includes a step of displaying business information concerning each of the plurality of certification partners in the network.

9. The method of claim 8 wherein said step of displaying business information concerning each of the plurality of certification partners further includes a step of providing targeted advertising for each of the certification partners.

10. The method of claim 8 wherein said step of receiving the at least one of a size or quality measurement for an animal further includes a step of receiving certified at least one of a size or quality measurement for an animal and wherein said step of associating the at least one of a size or quality measurement for an animal further includes the step of creating certified single trophy entries.

11. The method of claim 10 further including the steps of offering a profit sharing incentive to the plurality of certification partners corresponding to the number of single certified trophy entries by each of the certification partners.

12. The method of claim 11 further including the step of calculating the profit sharing incentive for each of the plurality of certification partners based on a percentage of annual profits generated from the remote database.

13. The method of claim 1 wherein the at least one of a size or quality measurement for an animal further includes acquiring at least one of a physical data, a user identity data, or an equipment data.

14. The method of claim 13 wherein the physical data includes at least one of a species identification, a size measurement, or a quality characteristic.

15. The method of claim 13 wherein the user identity data includes at least one of a name of the user, an email address, or a phone number.

16. The method of claim 15 wherein the equipment data includes at least one of the name of a guide service, a name of a lodge, a name of a camp, or a name of a facility used.

17. The method of claim 13 wherein the equipment data includes equipment used in at least one of observing the trophy entry or capturing the trophy entry.

18. The method of claim 17 wherein the equipment data includes at least one of a weapon used, a bait used, or an attractant used.

19. The method of claim 17 wherein the equipment data includes at least one of a tackle type, a lure type, a type of line, a type of rod, a type of reel, a type of bait, or an attractant used.

20. The method claim 1 wherein the location data includes at least one of a country, a state, a county, or an elevation.

21. The method of claim 20 wherein the elevation data includes the user's height relative to the ground when the trophy entry is at least one of observed or captured.

22. The method of claim 1 further including a step of automatically acquiring overlay data based on the at least one of a time data or a location data.

23. The method of claim 22 wherein the overlay data includes at least one of a pressure, a precipitation, a moon phase, a temperature, a wind chill, a heat index, a sunset time, or a sunrise time.

24. The method of claim 1 wherein the step of acquiring at least one of a time data or a location data further includes a step of automatically uploading the at least one of a time data or a location data to the remote database.

25. The method of claim 1 wherein the step of displaying the user single trophy entry with the determined rank further includes the step of displaying additional single trophy entries associated with the individual user.

26. The method of claim 1 wherein said step of displaying the user single trophy entry with the determined rank further includes displaying trophy entries from the plurality of single trophy entries of other users with ranks against the user single trophy entry.

27. The method of claim 1 further including a step of communicating the at least one of the size or quality measurement for an animal, the at least one of a time data or a location data, or the captured visual recording to the remote database having a plurality of single trophy entries.

28. The method of claim 1 further including a step of memorializing the user single trophy entry with a special icon including indicating if the harvest was at least one of a first deer, a first fish, or a first harvest of a particular species harvested.

29. A method of certifying trophy animal information through a network containing a plurality of certification partners comprising:
  prompting the individual user to input at least one of a size or a quality measurement for an animal;
  receiving the at least one of a size or a quality measurement for an animal;
  acquiring at least one of a time data or a location data;
  accessing a network containing a plurality of certification partners to determine the closest certification partner from the plurality of certification partners, wherein a certification partner is an independent third party;
  displaying business information concerning the closest certification partners;
  receiving at least one visual recording from at least one of an individual user or the certification partner related to the at least one of a size or a quality measurement for an animal;
  associating the at least one of a size or a quality measurement for an animal, the at least one of a time data or a location data, and the captured visual recording to create a user single trophy entry in a remote database;
  ranking the user individual single trophy entry relative to a plurality of single trophy entries in the remote database to determine a relative rank; and
  displaying the user single trophy entry with the determined rank.

30. The method of claim 29 further including the step of offering a profit sharing incentive to the plurality of certification partners.

31. The method of claim 30 wherein the profit sharing incentive corresponds to a number of single certified trophy entries by each of the certification partners.

32. The method of claim 30 wherein the profit sharing incentive for each of the plurality of certification partners is calculated based on a percentage of annual profits generated from the remote database.

33. The method of claim 29 further including a mobile application for uploading content to the remote database, and wherein the mobile application includes at least one of a picture module or a graphical user interface.

34. The method of claim 33 wherein the mobile application includes a graphical user interface to assist in categorizing the trophy animal information.

35. The method of claim 34 further including the step of uploading the certified trophy game animal entry automatically and in real time to the remote database in response to collecting and receiving the at least one of the at least one of a size or a quality measurement for an animal, the at least one of a time data or a location data or the visual recording of the trophy game animal from one of the certification partners.

36. The method of claim 33 further including a step of communicating to the remote database at least one of the trophy game animal information from the certification partner, the visual recording of the trophy animal, or the at least one of a time data or a location data.

37. The method of claim 29 further including a step of collecting and receiving the at least one of the at least one of a size or a quality measurement for an animal, the at least one of a time data or a location data, or a visual recording of the trophy animal from one of the certification partners in the form of a certified trophy animal entry.

38. The method of claim 29 wherein the step of acquiring at least one of a time or a location data further includes a step of automatically uploading the at least one of a time and a location data to the remote database.

39. The method of claim 29 wherein the ranking of the plurality of single trophy entries and the user single trophy entry is by at least one of the size or the quality information associated with the single trophy entry, and wherein the ranking of the user single trophy entry is relative to the plurality of single trophy entries stored on the remote database.

40. The method of claim 29 wherein the at least one of a size or quality measure further includes at least one of a physical data, a user identity data, or an equipment data.

41. The method of claim 40 wherein the physical data includes at least one of a species identification, a size measurement, or a quality characteristic.

42. The method of claim 29 further including a step of automatically acquiring overlay data based on the at least one of a time data or a location data.

43. The method of claim 42 wherein the overlay data includes at least one of a pressure, a precipitation, a moon phase, a temperature, a wind chill, a heat index, a sunset time, or a sunrise time.

44. The method of claim 29 wherein the step of displaying the user single trophy entry with the determined rank further includes the step of displaying additional single trophy entries associated with the individual user.

45. The method of claim 29 wherein said step of displaying the user single trophy entry with the determined rank further includes displaying trophy entries from the plurality of single trophy entries of other users with ranks against the user single trophy entry.

46. The method of claim 29 wherein said step of displaying business information concerning the closest certification partner includes targeted advertising for such certification partners.

47. A social media platform for displaying and ranking trophies taken by a plurality of users, comprising:
    a database containing a plurality of trophy entries uploaded by the plurality of users, each including user input information and a visual recording of the trophy entry received from at least one of an individual user or a certification partner;
    a ranking module having executable instructions for ranking said plurality of trophy entries stored in a database into a list of ranked trophy entries; and
    an output module having executable instructions for outputting said ranked trophy entries and said list of ranked trophy entries to a social media user interface and wherein said social media user interface includes an individual user page presenting said list of ranked trophy entries.

48. The social media platform of claim 47 wherein said social media user interface includes a user trophy room for each of the plurality of users.

49. The social media platform of claim 48 wherein said user trophy room is populated with and presents said trophy entries uploaded by the user.

50. The social media platform of claim 49 wherein said user trophy room populated with and presenting said trophy entries displays all said trophy entries uploaded by the user according to a predetermined criteria.

51. The social media platform of claim 49 wherein each of the trophy entries presented in the trophy room display said visual recording and at least a portion of said input information associated with said each of the trophy entries presented.

52. The social media platform of claim 47 wherein said user page is at least one of a web page or a mobile application.

53. The social media platform of claim 47 wherein the input information includes at least one of a location data, a physical data, an equipment data, a user identity data, or a time data.

54. The social media platform of claim 53 wherein said location data includes at least one of a country, a state, a county, or an elevation.

55. The social media platform of claim 54 wherein the elevation data includes the user's height relative to the ground when the trophy entry is at least one of observed and captured.

56. The social media platform of claim 53 wherein the physical data includes at least one of a species identification, a size measurement, or a quality characteristic.

57. The social media platform of claim 53 wherein the equipment data includes equipment used in at least one of observing or capturing the trophy entry.

58. The social media platform of claim 57 wherein the equipment data includes at least one of a weapon used, a bait used, or an attractant used.

59. The social media platform of claim 58 wherein the weapon used includes a classification of the type of weapon used, including at least one of a rifle, a shotgun, a pistol, a trap, or a bow.

60. The social media platform of claim 57 wherein the equipment data includes at least one at least one of a tackle type, a lure type, a type of line, a type of rod, a type of reel, a type of bait, or an attractant used.

61. The social media platform of claim 57 wherein the equipment data includes at least one of the name of a guide service, the name of a lodge, the name of a camp, or the name of a facility used.

62. The social media platform of claim 53 further including the step of automatically acquiring overlay data based at least one of the time data or the location data.

63. The social media platform of claim 62 wherein the overlay data includes at least one of a pressure, a precipitation, a moon phase, a temperature, a wind chill, a heat index, a sunset time, or a sunrise time.

64. The social media platform of claim 47 wherein said ranking module having executable instructions for ranking said trophy animal entries stored in said database further includes ranking by comparing at least a portion of said physical data of each trophy entry to generate a list of ranked trophy entries.

65. The social media platform of claim 47 wherein said social media user interface including a user page presenting said list of ranked trophy entries further including said list displaying said visual recording and at least a portion of said input information for each of said trophy entries presented on said list of ranked trophy entries.

* * * * *